United States Patent Office 2,822,689
Patented Feb. 11, 1958

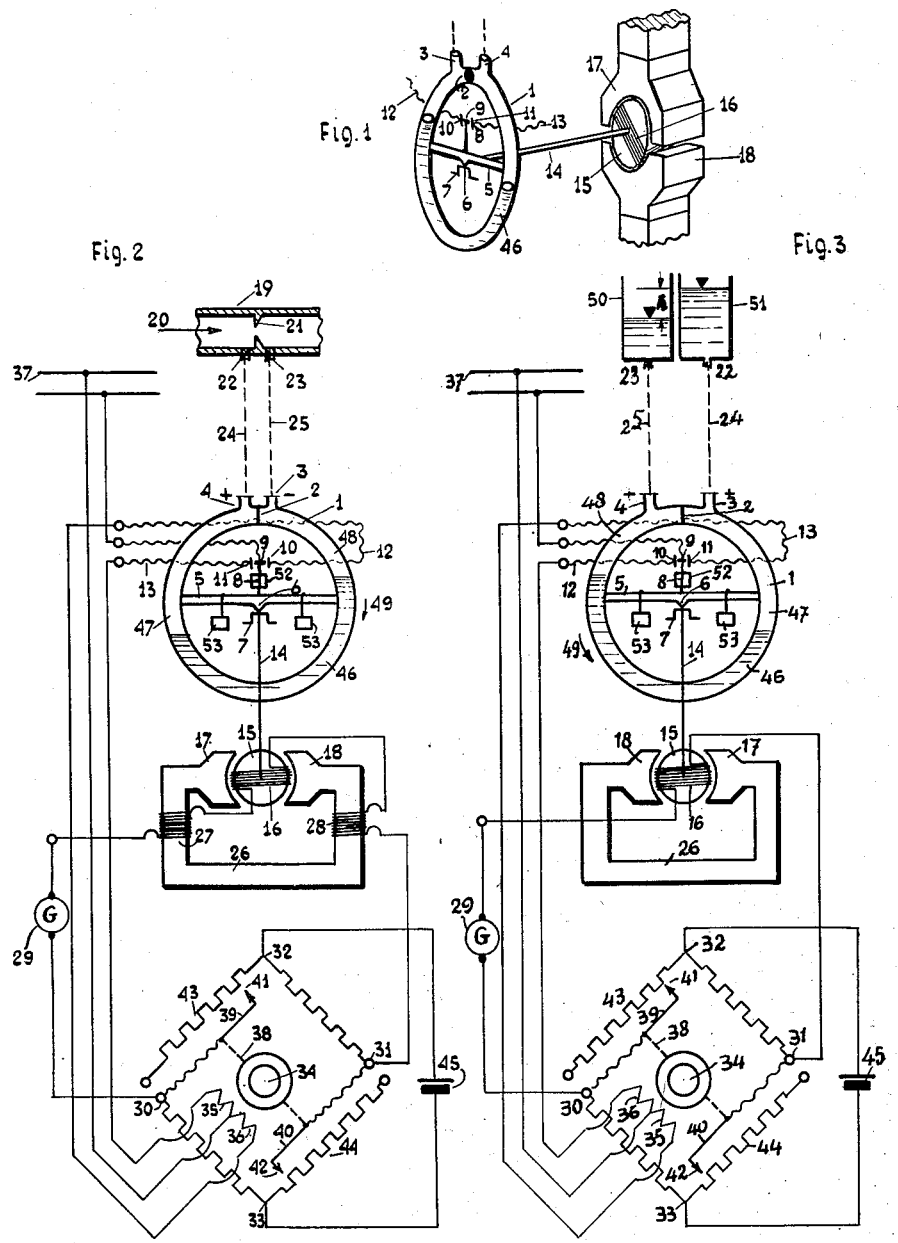

2,822,689

DEVICE FOR MEASURING PRESSURE DIFFERENTIAL WITH ELECTRICAL REBALANCE MEANS

Antonio Bonapace, Genoa, Italy, assignor to Firma Siemens & Halske A. G., Berlin, Germany Application June 14, 1954, Serial No. 436,661

Claims priority, application Italy June 20, 1953

3 Claims. (Cl. 73—405)

It is known that the measure of fluid quantity flowing in pipes can be realized through the measuring of a differential pressure as a square function of the flow quantity, where the differential pressure is produced through an orifice or a Venturi tube or by other means.

It is also known that it is possible to balance the effect of a differential pressure through a differential pressure of another auxiliary fluid controlled by a proper device.

The above mentioned methods are effected by means of a ring balance having an upper dividing set, partially filled by a liquid, the displacement of which makes the ring turn upon its axis, where the angular amount of rotation is a measure of the differential pressure or of the flow quantity.

This device which improved the measuring process has, however, some inconveniences, because the ring moves on a large angle which causes inertial force and elastic deformations of the pressure transmitting tubes, and because the indication is effected by means of moving mechanical parts liable to friction.

The device for the measuring of a differential in accordance with the invention, can be used in all cases where a differential pressure is to be measured or where arithmetic operations are performed on said differential pressure, for example for the measuring of a flow in a pipe through an orifice where the measured differential pressure is proportional to the square of the flow quantity, or for the measuring of a level, of a pressure or of depression or the like.

The device for the measuring of differential pressures in accordance with the invention, utilizes the well known ring balance, having inside an upper dividing set partially filled with a liquid, in balance on the edge of a knife and which is able to rotate in both senses with a minimum friction resistance and is characterized by the fact that to the above mentioned ring a reaction torque is applied, which substantially opposes the rotation tendency of the ring balance. The reaction torque value can be used for the measuring of the differential pressure and controlled by a very small angular displacement of the ring and by an electric power source.

The device in question is particularly characterized by the fact that the two chambers of the ring are connected by flexible tubes to the taps of the orifice, with said tubes not subjected to substantial elastic deformations because of the very small angular displacements of the ring.

The device according to the present invention is also characterised by having the ring balance rigidly and mechanically connected to a coil moving in the magnetic field between two polar expansions, and flown by an electric current, whose intensity is a function of the torque action on the ring balance.

In another embodiment the device according to the present invention is also characterised by having the ring balance rigidly and mechanically connected to a coil moving in a magnetic field between two polar expansions, and with this coil flown by an electric current, whose intensity is a function of the torque acting on the ring balance, and with the magnetic flux between the polar expansions determined by a magnetizing current.

In a particular embodiment the device according to the invention is also characterized by the fact that the magnetizing current is the same current flowing in the moving coil.

In a further particular embodiment the device according to the invention is characterized by the fact that a variation of the magnetic flux in which the moving coil is immerged, determined through the variation of the winding numbers and/or through the variation of the magnetizing current, gives a reading of the moment value acting on the ring balance.

The device according to the invention is also characterized by the presence of a servomotor moved through very small angular displacements of the ring and controlling the flowing current in the coil and/or in the magnetizing circuit of the magnetic field.

In this case the device is characterized in one of its embodiments by having the servomotor operating on a Wheatstone bridge, with one of its diagonals having inserted the electric current source and with the other diagonal bearing the moving coil and/or the magnetizing circuit and/or the measuring instruments, and with the electric resistances on two opposite arms variable in senses by means of an electric servomotor, the excitation and consequently the rotation of which are determined by the sense of the small rotations of the ring.

The device is also characterized by having some weights adjustable in their position, by means of which it is possible to influence the sensibility to oscillation of the ring-balance by shifting properly the gravity center relatively to the suspension center.

In the annexed drawings there are shown only by way of example two applications of the device amidst the many others which it is possible to perform.

Fig. 1 shows a perspective view of the ring balance with details of the device; Figs. 2 and 3 show a diagram of the device and its parts and their connections in the two given examples.

With particular reference to Fig. 1 there is represented at 1 is a hollow ring filled by a liquid 46 not easily evaporable, where the ring 1 has an upper dividing set 2 between two taps 3 and 4 for the transmission of pressures, the difference of which is to be measured. The ring is supported by means of a yoke 5 and a knife edge 6 and is in equilibrium on a plate 7. A vertical rod 8 fixed to the yoke has a movable contact 9 which can cooperate with one of the fixed contacts 10 and 11 which are connected with the electric lines 12 and 13. A shaft 14 is connected to the yoke 5 so that its axis is coaxial with the knife edge 6 and is also connected to the iron core 15, on which the moving coil 16 is wound. The iron core and the coil are placed in the interpolar space of the two polar expansions 17 and 18.

Consider now particularly Fig. 2 which shows the device used for the measuring of the flow quantity in a pipe 19, where a fluid is flowing in the direction of arrow 20. For simplicity of illustration the shaft 14 in Fig. 2 has been tilted on the plane of the drawing but the complex 1/10 of Fig. 2 is like that shown in Fig. 1. For the measuring of the flow quantity in the pipe 19 there is shown an orifice 21 with two taps 19 and 20 on its opposite sides. These two taps are connected through pipes 24 and 25 to the taps 4 and 3 of the ring 1. The polar expansions 17 and 18 belong to a ferrous magnet 26 the arms of which bear the windings 27 and 28 for the excitation of the magnetic field. The windings 27 and 28 are electrically connected in series with the moving coil 16 and with a galvanometer 29. The device has been connected to the apexes 30 and 31 of a Wheatstone bridge. The four arms 31—32, 32—30, 30—33, 33—31 of said bridge are formed as follows: the arms 31—32 and 30—33 embody a fixed resistance, the arms 30—32 and 31—33 embody a variable resistance and between them there is a servo-motor 34, consisting of an electric motor with two excitation windings 35 and 36. The winding 35 is connected to the power supply line 37 through the contact 11—9 and the winding 36 is connected to the supply line 37 through the contacts 9—10. The shaft 38 of the servo-motor has two arms 39 and 40 fitted with two sliders 41 and 42 which cooperate on the resistances 43 and 44 connected respectively to the apexes 32 and 33 of the Wheatstone bridge. The resistances 43 and 44 are disposed on a corcle of the same radius as that described by arms 39 and 40. The device is set in such a way that the rotation of shaft 38 and the travel of sliders 41 and 42 on the resistances 43 and 44 cause a variation in the same sense of the resistances 41—42 and 42—43. Between the apexes 32 and 33 an electric power source is inserted.

The operation of the device according to Figures 1 and 2 is as follows:

Until no differential pressure is available at the taps 3 and 4 the two liquid gauges in the ring are at the same level and contacts 9—10 and 9—11 are open. In this condition the Wheatstone bridge is balanced and the sliders 41 and 42 are in such a position that the resistances 43 and 44 are inserted. It is known that the presence of the orifice 21 on the pipe 19, through which the fluid is flowing in the direction of the arrow 20, produces before and behind the orifice two pressures whose differential value is a square function of the flow. Indicating the differential pressure as $dP$, the flow quantity as $Q$ and with $K_1$ a constant, it is $$dP = K_1 Q^2$$

The above mentioned pressures are transmitted to the chambers 47 and 48, limited by the two liquid surfaces and by the upper set, and they cause a liquid displacement in the ring so that the latter is inclined to rotate in the direction of the arrow 49 and causes the contacts 9—10 to shut so that an electric current flows in the excitation winding 36, and causes the servomotor to turn and vary both resistances 41—32 and 42—33 by decreasing them. As a consequence, at the apexes 30—31 of the Wheatstone bridge a differential voltage is available which causes an electric current flowing in the diagonal 30—31 with said current feeding the windings 27 and 28 and the moving coil 15 and producing a magnetic flux between the polar expansion 17 and 18. The electromagnetic effect of the flowing current causes on the shaft 14 a reaction torque in a direction opposite to the arrow 49. Therefore the ring turns in a direction opposite to the arrow 49 and the contact 9—10 opens, breaking the excitation current in the winding 36 and stopping the run of servomotor 34. The small angular rotation of the ring 1 is opposite to the rotation produced by the pressure difference and realizes an equilibrium condition for the ring balance, due to the electric current with an intensity I, flowing in the galvanometer 29, in the windings 27 and 28 and producing a magnetic flux $\phi$ which is proportional to the current intensity I in conformity to the expression $$\phi = K_2 I$$

where $K_2$ is a proportional constant; on the other hand the reaction torque M on the moving coil 15 is proportional to the above said flux $\phi$ as in the expression $$M = K_3 \phi I$$

where K is another proportionality constant.

From the above examples the reaction torque M can also be written as follows:

$$M = K_2 K_3 I^2$$

that is it is, proportional to the square of the current flowing through the galvanometer 29. Remembering that the torque M applied to the shaft 14 of the moving coil is equal and opposite to the mechanical torque acting on the ring balance and due to the differential pressure having the expression $$dP = K_1 Q^2$$

it follows that $$dP = KI^2$$

where the constant K comprehends the length of the lever arm by which the unbalanced fraction of liquid 46 weighs on the edge of the knife 6. It follows that from measuring of a current intensity I in 29 the value of a flow quantity in the pipe 19 can be derived. Furthermore the angular rotations of ring 1 are of a very small amount and this is an advantage because the tubes 24 and 25 do not influence the sensibility to rotation of the ring balance. Moreover the travel of the moving masses is also very small and the inertia forces are in consequence negligible so that the device can follow in indicating the most rapid variation of the measured flow. Moreover there are no moving mechanical parts liable to friction for the transmission of the indication so that the device indicates with the precision of the galvanometer 29, which is very high. Finally in the example illustrated in Fig. 2 the square of the value indicated by the galvanometer being proportional to the square of the flow quantity, the direct reading of the current intensity is also a measure of the flow quantity without any use of intermediate mechanical members for indication or for mathematic operations to be performed either by the device or by an operator.

It is evident that if the flow direction of the fluid should be reversed, that is against the direction of arrow 20, the contact 9—11 would be inserted, and through a small modification of the Wheatstone bridge it should be possible to measure also the reversed flow by means of a galvanometer with central zero scale, which indicates also the direction of the flow.

With reference to Fig. 3 the performance of a liquid level measure between two tanks 50 and 51 is shown. In Fig. 3 the same reference numbers and meanings of Fig. 2 have been used. In the embodiment of Fig. 3 only the windings 27 and 28 are omitted so that the reaction torque which the electric current produces in the shaft 14 is proportional to the current intensity itself, while the pressure difference, which causes unbalance of the ring is proportional to the first power of the pressure difference between the two tanks and therefore the reading of the current intensity I is the direct measure of the level difference $h$.

In Figs. 1 and 2 two applications have been shown in which the physical quantities directly measured are proportional respectively to the first and to the second power of the measure wanted. It is evident that by technical means it is possible to modify the electrical equipment of the device in order to enable the measuring of physical quantities which are proportional to an electric current with other power numbers.

Although in the interest of clarity, the present invention has been based upon the description of two embodiments only, many other modifications of the invention are within the scope thereof, for instance by setting a weight 52 for registering in height the gravity center of the ring balance, or by setting the weights 53, movable along the yoke 5, for the balancing of the ring in the rest condition. It is also possible to have the iron core 15 fixed and the coil movable or the iron core removed; the servomotor can be of any other type, for example a pneumatic motor with contemporary substitution of the elecric starting equipment. It will further be possible to eliminate the tubes 24 and 25 and to use any transmission of the pressures existing in front and behind the orifice 21 especially by means of a pneumatic transmission. These and other modifications have to be considered in the conception of the invention which are summarized in the following claims.

What I claim is:

1. Apparatus for electrically measuring pressure differentials sensed by a pressure responsive device of the ring balance type comprising a ring balance having an axial shaft and a frictionless pivot permitting rotation, connection means to a source of pressure differentials to be sensed and measured, whereby a difference of pressures will rotate said ring balance and said axial shaft, electromagnetic means for applying a restoring moment to said ring balance, said electromagnetic means comprising the combination of a source of current, switching means selectively operable by said ring balance, a rotor coil carried by said axial shaft, connection means between the source of current, the coil and the switching means, whereby when the ring balance is rotated because of a pressure differential being sensed and measured, said switching means are selectively actuated to selectively connect said source of current to the coil and supply a sufficient current to said coil to generate a counter-torque restoring said ring balance to an initial position, whereby said current represents the pressure differentials being measured, variable resistance follow-up means operably connected to control the current in said coil and instantaneously vary the current to generate a counter-torque as a function of the rotational torque applied to the ring balance by the pressure differential to restore the ring balance to an initial position, whereby the apparatus measures instantaneous changes and differences in said pressure differential.

2. An apparatus according to claim 1 in which said variable resistance follow-up means comprises a servo-system having a plurality of resistances, said servo-system being operatively controlled by said switching means to vary the resistance.

3. Apparatus for electrically measuring pressure differentials used by a pressure-responsive device of the ring balance type, comprising a hollow ring and a partition in said ring, means connected to said ring for sensing two different pressures and introducing said pressures into said ring, said ring having an axial shaft, switching means responsive to the rotation of said axial shaft and electromagnetic means for applying a restoring moment to said ring and current supply means responsive to said switching means for supplying a sufficient current to said electromagnetic means to return said ring to its initial position, whereby said current represents the pressure difference to be measured, the electromagnetic means comprising a rotor coil and means for producing a magnetic field through said coil, means for mounting said rotor coil for rotation about the same axis as that of said ring and rigidly mechanically connecting said rotor coil and the axial shaft of said ring, said means for producing the magnetic field through the rotor coil comprising at least one field winding and said current supply means causing the current supplied thereby to flow through the rotor coil and the field winding, said current supply means comprising a Wheatstone bridge having two variable resistance branches, a servomotor electrically connected to said switching means and mechanically connected to said variable resistance branches for adjusting the same, a source of electric current connected across one diagonal of the Wheatstone bridge, and a current meter, said current meter, said meter coil and said magnetic field producing means being connected across the other diagonal of the Wheatstone bridge.

References Cited in the file of this patent
UNITED STATES PATENTS

| | | |
|---|---|---|
| 1,160,679 | Wilkinson | Nov. 16, 1915 |
| 2,082,539 | Fischer | June 1, 1937 |
| 2,688,253 | Markson | Sept. 7, 1954 |

FOREIGN PATENTS

| | | |
|---|---|---|
| 570,184 | Great Britain | June 26, 1945 |